May 9, 1967     W. M. BARR     3,318,471
VEHICLE TRUNK LID CLOTHES CARRIER
Filed Nov. 12, 1965
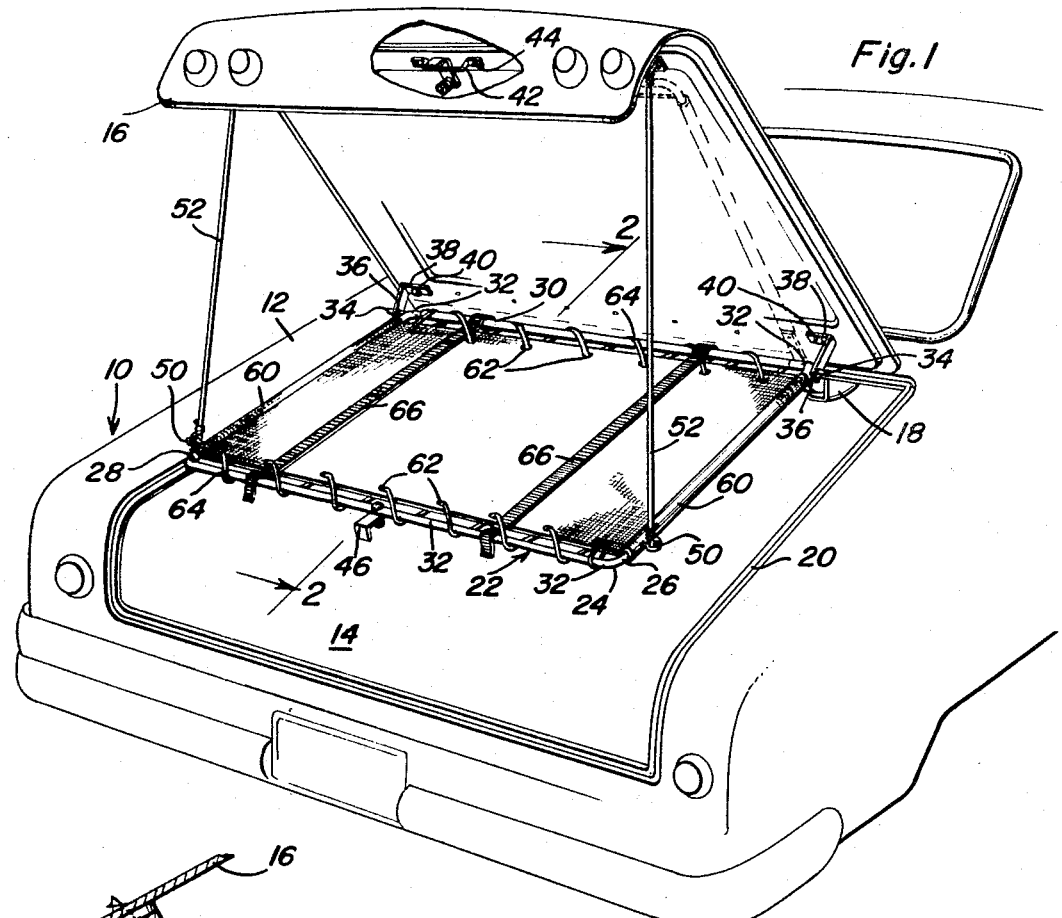
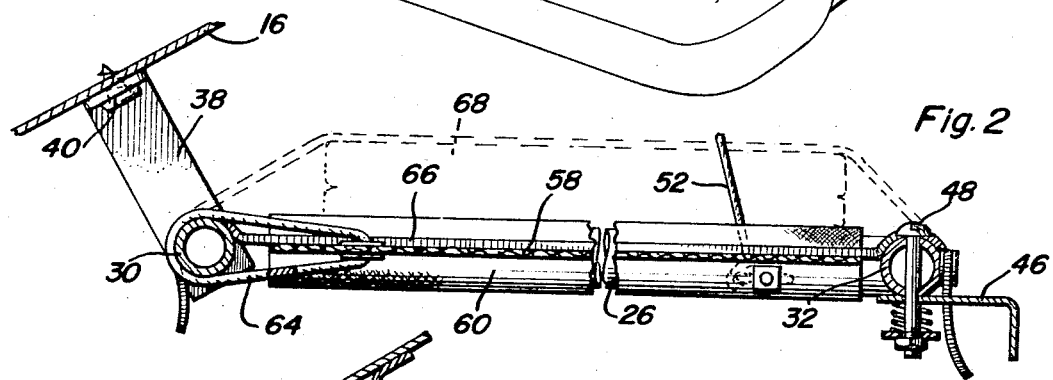
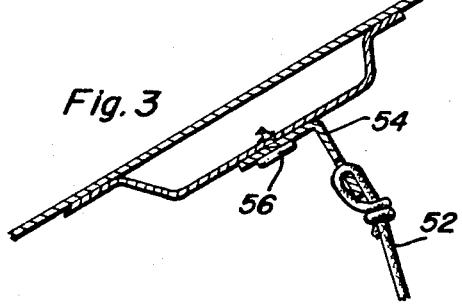
Weldon M. Barr
*INVENTOR.*

United States Patent Office 3,318,471
Patented May 9, 1967

3,318,471
VEHICLE TRUNK LID CLOTHES CARRIER
Weldon M. Barr, Mount Vernon, Ohio
(3500 W. Lakeview, Sebring, Fla. 33870)
Filed Nov. 12, 1965, Ser. No. 507,313
7 Claims. (Cl. 214—450)

This invention relates to a novel and useful vehicle trunk lid clothes carrier and more specifically to a frame-like assembly adapted to be pivotally secured to the undersurface of a vehicle trunk lid adjacent the edge portion of the trunk lid which is hingedly supported from the associated vehicle body.

Means is provided at the free edge portion of the frame-like assembly of the instant invention and operatively engageable with a corresponding portion of the associated trunk lid for releasably securing the free swinging edge portion of the assembly to the trunk lid in close underlying relation therewith. The frame-like assembly of the instant invention includes a flexible support panel stretched thereacross and at least one elastic clothes hold-down member is secured to and extends between opposite sides of the frame-like assembly in overlying relation to the flexible support panel. The hold-down member is of course adapted to stationarily position articles such as wearing apparel on the upper surface of the flexible support panel beneath the undersurface of the associated trunk lid or luggage compartment cover.

The main object of this invention is to provide a vehicle trunk lid clothes carrier of the type above set forth which may be conveniently utilized for orderly supporting wearing apparel and the like within the luggage compartment of the vehicle without the wearing apparel being enclosed in any form of luggage.

Another object of this invention, in accordance with the immediately preceding object, is to provide a clothes carrier adapted to support wearing apparel within the luggage compartment of a vehicle at an elevation spaced above the flooring of the luggage compartment and in position closely underlying the lid or cover of the luggage compartment when the latter is in its closed position.

A final object of this invention to be specifically enumerated herein is to provide a vehicle trunk lid clothes carrier in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary perspective view of the rear portion of the conventional form of passenger motor vehicle shown with the cover of the luggage compartment thereof in an open position and with the clothes carrier of the instant invention supported from the luggage compartment cover with the free end thereof lowered so as to provide access to the upper wearing apparel supporting surface of the clothes carrier;

FIGURE 2 is an enlarged fragmentary longitudinal vertical sectional view taken substantially upon the plane indicated by the section line 2—2 of FIGURE 1; and FIGURE 3 is a fragmentary enlarged vertical sectional view taken substantially upon a plane passing through the free swinging edge portion of the trunk lid and illustrating the manner in which one of the tension members utilized to limit downward swinging movement of the free edge portion of the clothes carrier is secured to the top lid or luggage compartment cover.

Referring now more specifically to the drawings the numeral 10 generally designates a conventional form of passenger motor vehicle including a body 12 defining a luggage compartment 14 in the rear portion thereof and provided with a hinged cover 16 for the luggage compartment 14.

The cover 16 is hingedly supported from the body 12 in the usual manner by means of opposite side hinge assemblies 18 in a manner pivotally securing the forward marginal edge portions of the cover 16 to the portions of the body 12 defining the forward extremity of the luggage compartment opening 20.

The clothes carrier of the instant invention is generally referred to by the reference numeral 22 and includes a main frame 24 which is substantially rectangular in shape and is constructed of tubular material. The frame 24 includes opposite side members 26 and 28 and front and rear members 30 and 32. The frame may be formed of one piece of tubing with the intersections between adjacent sides of the frame 24 defined by integral smoothly curving right angular bends 32 formed in the tubing. The bends 32 interconnecting the front member 30 and the opposite side members 26 and 28 include aligned stub axle portions whose free ends are rotatably journaled in suitable apertures 36 provided therefor formed in a pair of angle brackets 38 dependingly secured to the undersurface of the forward marginal edge portion of the cover 16 by means of fasteners 40.

A keeper member 42 is secured to the undersurface of the rear free swinging marginal edge portion of the cover 16 in any convenient manner such as by fasteners 44 and a latch member 46 is pivotally supported from the rear frame member 32 by means of a suitable pivot fastener 48. The latch member 46 is releasably engageable with the keeper member 42 when the frame 24 is in the position illustrated in phantom lines in FIGURE 1 of the drawings in order that the frame 24 may be held in position closely underlying the cover 16.

A pair of eye members 50 are secured to and project outwardly from the rear ends of the side members 26 and 28 of the frame 24 and have corresponding ends of a pair of elongated flexible tension members 52 secured thereto. The other pair of corresponding ends of the tension members 52 are secured to a second pair of L-shaped mounting brackets 54 secured to the undersurface of the free swinging edge portion of the cover 16 by means of fasteners 56.

A flexible support panel 58 is disposed between the opposite side and front and rear members of the frame 24 and has hems 60 formed in its opposite ends in any convenient manner such as by stitching, through which hems the opposite side frame members 26 and 28 extend. The front and rear marginal edge portions of the panel 58 each has a plurality of longitudinally spaced eyelets 62 secured thereto at points spaced longitudinally thereof and a pair of elongated flexible tie members 64 are looped about the front and rear members 30 and 32 of the frame 24 and passed through the eyelets 62 so as to secure the front and rear marginal edge portions of the panels 58 to the front and rear members 30 and 32 of the frame 24.

A pair of elongated elastic clothes hold-down members 66 have one pair of corresponding edge portions secured to the front frame member 32 and the other pair of corresponding end portions secured to the rear frame member 32. The hold-down members 66 extend over the support panel 58 and may have their mid portions pulled away from the panel 58 and wearing apparel 68 placed thereunder. In this manner, the hold-down members 66 may be utilized to stationarily position and removably secure the wearing apparel 68 on the support panel 58.

The tension members 52 of course limit downward swinging movement of the free end of the frame 24 and the latter, after being loaded with the apparel 68, may be swung to the upper position illustrated in phantom lines in FIGURE 1 of the drawings with the latch member 46 engaged with the keeper 44 prior to the closing of the cover 16. Of course, when the frame 24 is positioned as illustrated in phantom lines in FIGURE 1 of the drawings and the cover 16 is closed, a considerable portion of the luggage compartment 14 remains unobstructed adjacent the floor thereof and may be utilized to support conventional luggage.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a vehicle luggage compartment cover which is generally horizontally disposed when closed and of the type hingedly secured along its front marginal edge portion to a portion of a vehicle body defining a corresponding boundary of a luggage compartment opening for movement between a closed position and a rearwardly and upwardly inclined open position, a clothes carrier supported solely from said cover and including an open support frame having a first marginal side edge portion hingedly secured to said one edge portion beneath the latter for rotation about an axis generally paralleling the axis of rotation of said cover relative to said body portion, coacting latch means carried by the free swinging edge portion of said frame and said cover releasably securing said free swinging edge portion of said frame to said cover, said frame including a flexible support panel stretched across and supported therefrom and extending from said first side edge portion to the remote side edge portion of said frame, and at least one clothes hold-down member extending between opposite marginal edge portions of said frame and disposed over the side of said support panel facing said cover and at least one elongated flexible tension member secured between said free swinging edge portion and said cover limiting swinging movement of the free edge portion of said frame away from said cover to a position with said frame generally horizontally disposed when said cover is in its open position.

2. The combination of claim 1 wherein said frame is constructed of rigid tubular material.

3. The combination of claim 1 wherein one pair of opposite marginal edge portions of said panel include hems through which corresponding marginal portions of said frame extend.

4. The combination of claim 1 wherein one pair of opposite marginal edge portions of said panel include longitudinally spaced eyelets, and elongated flexible tension members looped about the corresponding marginal portions of said frame and passed through said eyelets.

5. The combination of claim 4 wherein a second pair of opposite marginal edge portions of said panel include hems through which corresponding marginal portions of said frame extend.

6. In combination with a vehicle luggage compartment cover of the type hingedly secured along one marginal edge portion thereof to a portion of a vehicle body defining a corresponding boundary of a luggage compartment opening, a clothes carrier including an open support frame having a first marginal side edge portion hingedly secured to said one edge portion beneath the latter for rotation about an axis generally paralleling the axis of rotation of said cover relative to said body portion, coacting latch means carried by the free swinging edge portion of said frame and said cover releasably securing said free swinging edge portion of said frame to said cover, said frame including a flexible support panel stretched across and supported therefrom and extending from said first side edge portion to the remote side edge portion of said frame, and at least one elastic clothes holddown member extending between opposite marginal edge portions of said frame and disposed over the side of said support panel facing said cover, one pair of opposite marginal edge portions of said panel including longitudinally spaced eyelets, elongated flexible tension members looped about the corresponding marginal edge portions of said frame and passed through said eyelets, a second pair of opposite marginal edge portions of said panel including hems through which corresponding marginal portions of said frame extend, at least one elongated flexible tension member secured between said free swinging edge portion and said cover limiting swinging movement of the free edge portion of said frame away from said cover.

7. The combination of claim 6 wherein said frame is constructed of rigid tubular material.

References Cited by the Examiner

UNITED STATES PATENTS

| 1,116,039 | 11/1914 | Dunham | 224—42.44 |
| 2,573,102 | 10/1951 | Hennessy | 224—42.42 X |
| 2,577,263 | 12/1951 | Myers | 224—42.42 |
| 3,209,969 | 10/1965 | Hennagin | 224—29.3 |

FOREIGN PATENTS 469,285  11/1950  Canada.

GERALD M. FORLENZA, *Primary Examiner.*

F. E. WERNER, *Assistant Examiner.*